United States Patent [19]
Karayannis et al.

[11] 4,111,836
[45] Sep. 5, 1978

[54] PROCESS FOR FORMING HIGH PERFORMANCE TITANIUM TRICHLORIDE OLEFIN POLYMERIZATION CATALYST COMPONENTS

[75] Inventors: Nicholas M. Karayannis; Harold Grams, both of Naperville, Ill.

[73] Assignee: Standard Oil Company (Indiana), Chicago, Ill.

[21] Appl. No.: 738,390

[22] Filed: Nov. 3, 1976

[51] Int. Cl.$^2$ .............................................. C08F 4/64
[52] U.S. Cl. ................................ 252/429 B; 526/141; 526/142; 526/136
[58] Field of Search ..................................... 252/429 B

[56] References Cited

U.S. PATENT DOCUMENTS

| | | | |
|---|---|---|---|
| 3,206,448 | 9/1965 | Naylor | 252/429 B X |
| 3,660,519 | 5/1972 | Arakawa et al. | 252/429 B X |
| 3,919,180 | 11/1975 | Furukawa et al. | 252/429 B X |
| 3,926,928 | 12/1975 | Karayannis et al. | 252/429 B X |
| 3,984,350 | 10/1976 | Karayannis et al. | 252/429 B |
| 4,008,177 | 2/1977 | Rust et al. | 252/429 B |

*Primary Examiner*—Patrick P. Garvin
*Attorney, Agent, or Firm*—Stephen L. Hensley; Arthur G. Gilkes; William T. McClain

[57] ABSTRACT

A process is described herein for improving the soluble polymer production of, while maintaining substantially the same crystalline polymer yield of, a high surface area, large porosity, brown catalyst component comprising beta titanium trichloride and some of at least one organic electron pair donor compound, which component is prepared by (a) organoaluminum compound reduction of titanium tetrachloride followed by (b) incorporation of the reduced solid with said donor compound and thereafter (c) treatment with titanium tetrachloride. The improved process comprises treatment at ambient temperature or somewhat above with an additional organic electron pair donor compound such as an ester, an amine, an organic borate or a coordinating, cyclic hydrocarbon containing at least one double bond, etc., after (b) or (c) above and prior to use of said component in polymerization.

9 Claims, No Drawings

PROCESS FOR FORMING HIGH PERFORMANCE TITANIUM TRICHLORIDE OLEFIN POLYMERIZATION CATALYST COMPONENTS

SUMMARY OF THE INVENTION

This invention relates to a process for improving the olefin polymerization performance of a high surface area, large porosity, brown catalyst component comprising beta titanium trichloride and some, up to about ten mol percent, of at least one organic electron pair donor compound made by (a) reduction of titanium tetrachloride using an organoaluminum compound followed by (b) incorporation of the reduced solid with said donor compound and thereafter (c) treatment with titanium tetrachloride, which improvement comprises treatment at about ambient temperature or somewhat above with an additional organic electron pair donor compound which is not an ether after (b) or (c) above and prior to use of said component in polymerization and, more particularly, to an improved process for producing a high surface area, large porosity, brown olefin polymerization catalyst component comprising beta titanium trichloride and some, up to about ten mol percent, of at least one organic electron pair donor compound made by (a) reduction of titanium tetrachloride using a reductant comprising a lower alkyl, dialkylaluminum compound, thereafter (b) incorporating the solid reduction product with said donor compound and (c) subsequently treating with titanium tetrachloride, which improved process comprises treatment at about ambient temperature or somewhat above after (b) or (c) above and prior to use in polymerization with an ester, an organic borate, an amine or a coordinating, cyclic hydrocarbon containing at least one double bond, said component of substantially improved ability to reduce formation of soluble polymer while substantially maintaining crystalline yield when used in alpha-olefin polymerization.

In accordance with the instant invention, an improved process is set forth for making a brown catalyst component having a surface area of above about eighty square meters per gram and porosity of above about one-tenth cubic centimeters per gram comprising beta titanium trichloride and at least one organic electron pair donor compound comprising isopentyl ether, which component is which by (a) reduction of titanium tetrachloride with a reductant comprising a lower alkyl, dialkylaluminum chloride, (b) subsequent incorporation of the resulting solid with said donor compound and thereafter (c) treatment with titanium tetrachloride, which improved process comprises treatment after (b) or (c) above with a lower alkyl, alkyl ester of benzoic acid, a tri-(lower alkyl) amine, a lower alkyl, trialkyl borate or cycloheptatriene in the presence of an inert liquid medium at about ambient temperature or somewhat above, and thereafter using the so-treated solid catalyst component in conjunction with an alkylaluminum compound for the polymerization of propylene or a propylene dominated mixture.

BACKGROUND OF THE INVENTION

In U.S. Pat. No. 3,984,350 a method of forming a high activity, low solubles producing, brown catalyst component comprising beta titanium trichloride is taught which has its prime utility in the polymerization of propylene or a propylene dominated alpha-olefin mixture when promoted with an alkylaluminum compound. Such component is a high surface area, large porosity material containing a small amount of one or more organic electron donor compounds. Although the component produces a large polymerization yield of crystalline polymer and a small solubles production compared to all prior art beta titanium trichloride catalyst components, further improvements can be of extreme commercial importance because of the size of yearly world production of such polymers. For example, even a one percent decrease in production of soluble polymer while maintaining or not seriously reducing the crystalline yield could produce savings in the millions of dollars per year range.

Now it has been found that if a material such as an ester, an amine, an organic boron or a coordinating, cyclic hydrocarbon containing at least one double bond, etc., is used in the preparation process prior to use in polymerization, an improved component results which produces substantially decreased polymer solubles at substantially the same crystalline polymer yield.

STATEMENT OF THE INVENTION

The invention taught herein relates to a brown solid catalyst component comprising beta titanium trichloride and some, up to ten mol percent, of at least one organic electron pair donor compound selected from the group consisting of hydrocarbyl ethers, said component which is predominantly beta titanium trichloride having a surface area of above about eighty square meters per gram and a pore volume of above about one-tenth cubic centimeter per gram and combinations of such brown solid with an organoaluminum compound promoter, preferably a dialkylaluminum chloride, for the polymerization of alpha-olefins, particularly propylene.

The unimproved component in a preferred manner of preparation is made by (a) reacting titanium tetrachloride and a reductant comprising a lower alkyl, dihydrocarbylaluminum halide, preferably a lower alkyl, dialkylaluminum chloride, in a mol ratio of about one mol titanium compound to one-half to three mols of aluminum compound at a temperature below about 0° C. in the presence of an inert liquid capable of dissolving said titanium tetrachloride; (b) raising the temperature of the product of (a) to less than about 100° C.; (c) incorporating the brown solid resulting from (b) in the presence of an inert, liquid solvent with at least one of donor compounds selected from the group consisting of hydrocarbyl ethers, in a mol ratio within the range of about one-half to five mols of said donor compound per mol of titanium contained in said brown solid of (b); (d) heating the result between about ambient and about 80° C.; (e) treating the brown solid of (d) at a temperature between about 40° C. and about 100° C. with a solution in an inert liquid of titanium tetrachloride at conditions of temperature, time, concentration of said titanium tetrachloride dissolved in said inert liquid solvent, and mol ratio of titanium tetrachloride to titanium contained in said brown solid of (d) which convert said brown solid of (d) into a brown solid having a surface area of above about eighty square meters per gram and a pore volume of above about one-tenth cubic centimeter/gram; and (f) recovering from (e) a solid polymerization catalyst component comprising brown, beta titanium trichloride containing up to about ten mol percent of said at least one ether, said component having a surface area of above about eighty square meters per gram and a pore volume of above about one-tenth cubic centimeter/gram. This component can be used with an organoaluminum compound promoter, particularly a lower alkyl, dialkylaluminum chloride, for the polymerization of alpha-olefins, particularly propylene.

The brown solid described herein preferably has a BET surface area larger than about fifty square meters per gram, more preferably, above about eighty square meters per gram and, most preferably, above about one hundred square meters per gram. The color, x-ray powder diffraction pattern and chloride to titanium ratio defines the inorganic portion of the brown solid as being substantially titanium trichloride in the beta crystalline modification. Porosity measurements on the brown solid show that it preferably has a pore volume of above about one-tenth cubic centimeter per gram, more preferably, above about fifteen-hundredths cubic centimeter per gram and, most preferably, above about twenty-hundredths cubic centimeter per gram.

Investigation of the morphology of the brown solid using electron microscopy shows the solid to be irregularly shaped but somewhat rounded particles which appear to be clusters of still smaller particles.

In a preferred embodiment the improved component is made by the improved process as described in the following few paragraphs.

Usefully, any substantially inert liquid medium is used for the preparative and washing steps in the preparation of the improved brown catalyst component. Alkanes such as pentane, hexane, cyclohexane and the like and halogenated compounds such as chlorobenzene and chloroalkanes may be used after suitable purification to remove water and other polar constituents such as alcohols, mercaptans, etc. More preferably, lower alkanes are the media used and, most preferably, hexane is used.

For the reduction of the titanium tetrachloride, a reductant comprising di-(hydrocarbyl)aluminum compound is preferred, more preferably, a dialkylaluminum chloride alkylaluminum dichloride mixture can be used, and most preferably, a lower alkyl, alkylaluminum sesquichloride such as ethylaluminum sesquichloride is used. By lower alkyl is meant here an alkyl radical of from one to about eight carbon atoms.

The reduction temperature is best kept below about 0° C. while the titanium tetrachloride and organoaluminum compound or compounds are slowly admixed and it is generally maintained for a certain period thereafter. Preferably, admixing is accomplished with agitation. More preferably, a temperature between about −30° C. and about 0° C. is used and, most preferably, a temperature in the range of about −10° C. to about 0° C. is used.

The slurry formed by the reduction is thereafter briefly heated at a temperature up to 100° C., more preferably, up to about 80° C. By briefly is here meant more than a few minutes and less than several hours.

The amount of organoaluminum compound used varies with the amount of titanium tetrachloride used and preferably runs from about one mol titanium compound per one-half to three mols of aluminum compound. More preferably, the organoaluminum compound to titanium compound ratio varies from about 2:1 to about 0.5:1 and, most preferably, from about 1.5:1 to about 0.75:1.

The solid resulting from the reduction which is essentially a low surface area form of brown titanium trichloride containing small amounts of organoaluminum compounds, is preferably separated and briefly washed, and the result thereof is treated in an incorporation operation in the presence of an inert liquid medium with at least one organic electron pair donor compound which is a hydrocarbyl ether. Preferably, said donor compound is an alkyl ether, more preferably, said donor compound is a lower alkyl, ether such as n-butyl, isobutyl, cyclohexyl, isopentyl or octyl ether and the like, or an ether in which the organic groups are of a mixed nature such as isobutylisopentyl ether, isopentylphenyl ether, etc. Most preferably, said donor compound is a $C_5$ or $C_4$ ether such as isopentyl ether or a mixture of isopentyl and n-butyl ethers. By lower alkyl is meant here alkyl groups having two to about eight carbon atoms.

In general, the reactants in the electron pair donor compound incorporation are added at about ambient temperature and the result thereof heated between about ambient and about 80° C. More preferably, the heating is accomplished at a temperature in the range from about 30° C. to about 70° C. and, most preferably, the heating is done at about 35° C. to about 50° C.

The amount of said organic electron pair donor compound which is added to the separated and washed solid from the first step preferably runs between about one-half to five mols of said donor compound per mol of titanium contained in said solid. More preferably, it varies between about seventy-five hundredths to two mols of said organic electron pair donor compound per mol of titanium contained in said solid, and, most preferably, the mol ratio can vary from about 0.9:1 to 1.5:1.

The heating period of the incorporation preferably varies between about ten minutes and a few hours with fifteen minutes to two hours being more preferred.

After the above treatment with said organic electron pair donor compound, the solid product from the incorporation is preferably separated and washed with an inert liquid medium.

The solid product resulting from such incorporation which is essentially a brown, low surface area form of titanium trichloride containing small amounts of organoaluminum compounds and some of the donor compound is then treated with titanium tetrachloride for a few minutes to a few hours, preferably fifteen minutes to several hours, in contact with an insert liquid medium. The temperature range of this heating varies from about ambient temperature to about 100° C., preferably about 30° C. to about 80° C., and, more preferably, about 40° C. to about 70° C.

The process of treating the solid material from the incorporation with the electron pair acceptor compound in solution is preferably carried out using a mol ratio of said acceptor compound to titanium contained in said solid of about 10:1 to about 0.5:1. More preferably, it runs from a mol ratio of about 5:1 to about 0.5:1 and, most preferably, a mol ratio of about 3:1 to about 1:1 is used. It is important here not to use a highly concentrated solution of the electron pair acceptor compound. A five to thirty volume percent solution is preferable.

The high surface area, high porosity brown catalyst component is preferably treated during its production, after incorporation or treatment wiht $TiCl_4$, with an additional organic electron pair donor compound which is not an ether. Preferably, it is treated after the $TiCl_4$ treatment with a hydrocarbyl ester, an amine, an organic borate or a coordinating, cyclic hydrocarbon containing at least one double bond and the like. The treatment is preferably accomplished with said additional donor compound at least partially dissolved in a substantially inert, liquid medium such as a hydrocarbon, a chlorocarbon and the like. Temperature of treatment is preferably from about 10° C. to about 45° C. and, more preferably from about 15° C. to about 35° C. and, most preferably, about 20° C. to about 30° C. Higher temperatures minimize the improvement and can completely eliminate it. Time of treatment is not critical being preferably from several minutes to several hours.

The high surface area, large porosity brown solid resulting from this treatment is then preferably separated, washed with small amounts of an inert liquid medium and used in conjunction with an organoaluminum compound promoter such as an aluminum trialkyl or a dialkylaluminum halide, preferably a dialkylaluminum chloride, for polymerizing alpha-olefins. Preferably, a lower alkyl, dialkylaluminum chloride is used. In the case of a brown solid made using a coordinating, cyclic hydrocarbon containing at least one double bond the component after treatment is preferably not separated and washed when the coordinating ability of the double bond is weak.

The catalyst combination of an organoaluminum compound and the brown solid may be used for slurry, bulk phase or vapor phase alpha-olefin polymerization with excellent results.

Although the catalyst component and organoaluminum compound are preferably used for propylene polymerization to form highly crystalline polypropylene it may be used for other $C_2$ to $C_{10}$ terminal olefins as well, e.g., ethylene, 1-butene, 1-pentene, 4 methyl-pentene-1, vinylcyclohexane, etc. and, additionally, for preparing highly crystalline, random, terminal block and pure block types of copolymers of propylene and a second alpha-olefin or propylene and ethylene.

The polymerization conditions of temperature, pressure and concentrations used for the catalyst combinations described herein are generally those known previously to or easily determined by those skilled in the art of alpha-olefin polymerization.

The solubles or extractables may be further reduced by modifying the instant catalyst combination with at least one modifier such as an amine, preferably a sterically hindered cyclic amine, an amine oxide, an ether, an organic phosphite, a polyether such as diglyme, etc., introduced into the polymerization reactor. Mixtures of alkyltin sulfides such as bis-(tributyl)tin sulfide with an amine, amine oxide or organic phosphite or mixtures of hydrogen sulfide or sulfur dioxide with an amine, amine oxide or organic phosphite are also useful to further reduce solubles. The latter mixtures appear particularly good in reducing solubles with only a slight effect upon polymer yield.

While the invention is described in connection with the specific EXAMPLES below, it is to be understood that these are for illustrative purposes only. Many alternatives, modifications and variations will be apparent to those skilled in the art in the light of the below EXAMPLES and such alternatives, modifications and variations fall within the scope and spirit of the appended claims.

GENERAL EXPERIMENTAL PROCEDURE

All solvents and polymerization media used were treated to remove water and other polar materials prior to use herein.

The powder x-ray diffraction measurements were carried out on material in sealed glass tubes in the usual way using a diffractometer. Porosity measurements were made using an American Instrument Company, Silver Springs, Md., high pressure mercury porosimeter (60,000 p.s.i.).

Surface area measurements were accomplished employing the one point BET method using a ten percent nitrogen-ninety percent helium mixture. The sample was pretreated at ambient for about one hour in a slow stream of the above gas mixture, then cooled to liquid nitrogen temperature for about forty-five minutes for nitrogen adsorption and finally warmed to ambient and the composition of the desorbed gas measured with a thermal conductivity detector.

Polymerization activities are grams of crystalline polymer (total polymer minus solubles) per gram of brown solid per hour of polymerization.

EXAMPLE I

A 98 milliliter portion of dry hexane and 50 milliliters of titanium tetrachloride were added to a round bottom flask. The flask and its contents were protected under a blanket of dry nitrogen throughout the preparation. The solution was stirred with a magnetic stirring bar and cooled in an ice bath maintained at $-3°$ to 0° C. A 583 milliliter portion of ethylaluminum sesquichloride in hexane (25 weight percent ethylaluminum sesquichloride, solution density 0.77 grams/milliliter) was added dropwise to the titanium tetrachloride solution over a three hour period. After the alkyl addition was complete, the slurry was stirred at the same temperature for 15 minutes, fitted with a condenser, and then heated to 65° C. within one hour. The slurry was stirred at 65° C. for one hour. After cooling to room temperature, the solid was washed with five portions of dry hexane by decantation with the last wash performed at 65° C.

The solid was decanted, 576 milliliters of dry hexane and 102 milliliters isopentyl ether added, and the slurry stirred at 35° C. for one hour. The solid was then washed with five portions of dry hexane by decantation.

A 20.3 volume percent stock solution of titanium tetrachloride in hexane (57 milliliters titanium tetrachloride plus 224 milliliters hexane) was added to the decanted solid. The slurry was stirred at 62°-65° C. for two hours and cooled to room temperature. The solid was washed with five portions of dry hexane by decantation with the last wash performed at 65° C. The solid was decanted and hexane added to give a slurry.

A 12 gram amount of brown catalyst component with its associated hexane was added to 110 milliliters of hexane and stirred with a solution of 0.6 gram of ethyl benzoate dissolved in 100 milliliters of hexane at ambient temperature for 30 minutes. The solid was allowed to settle, the supernatant removed, the solid washed with 100 milliliters of hexane and finally diluted to a stock slurry with 150 milliliters of hexane.

EXAMPLE II

The procedure of Example I was followed except 0.6 milliliters of cycloheptatriene was substituted for the ethyl benzoate.

EXAMPLE III

The procedure of Example I was followed except that 0.6 milliliters of tetramethylpyrazine was substituted for the ethyl benzoate.

EXAMPLE IV

The procedure of Example I was followed except that 0.6 milliliters of trimethyl borate was substituted for the ethyl benzoate.

EXAMPLE V

This Example was a scale-up of Example I. Minor differences in number of washings and holding and addition times were made.

EXAMPLE VI

This Example is essentially the same as Example V except for the time of addition of the reductant. Also, 0.6 milliliters of isoamyl ether was substituted for the ethyl benzoate.

EXAMPLE VII

Same as Example VI except that 0.6 milliliters of butyl ether ($Bu_2O$) was substituted for the isoamyl ether ($i-Am_2O$).

Example VIII

Same as Example VII except that 0.6 milliliters of bis-(dibutyl tin) sulfide (BTS) substituted for the isoamyl ether.

EXAMPLE IX

Same as Example VIII except that 0.6 milliliters of 2,4,6-collidine (Coll) was substituted for the BTS.

EXAMPLE X

This Example was a scale up of Example II using slightly different reductant addition and holding times.

EXAMPLE XI

Same as Example X except that 0.6 milliliters of tributylamine was substituted for the cycloheptatriene.

EXAMPLE XII

The two hour polymerizations in this Example were run in pressure bottles at 70° C., 40 psig. propylene pressure, no hydrogen, 200 milliliters of hexane at a $Et_2AlCl$/brown solid ratio of 2.8/1.

TABLE

| Example No. | Polymerization Activity** (wt./wt. brown solid/hr.) | Hexane** Solubles (wt. %) |
| --- | --- | --- |
| * | 224 | 2.8 |
| I | 201 | 0.8 |
| * | 244 | 2.8 |
| II | 193 | 2.4 |
| * | 232 | 2.7 |
| III | 190 | 2.2 |
| * | 238 | 2.2 |
| IV | 190 | 1.8 |

*Sample of brown solid made without final treatment and run as control.
**Each value is the average of four polymerizations except for the controls which are the average of two polymerizations.

EXAMPLE XIII

The four hour polymerizations in this Example were run in a 2 liter reactor at 160° F., 160 psig propylene, 7 psig hydrogen. A 3/1 ratio of $Et_2AlCl$/brown solid was employed.

TABLE

| Example No. | Polymerization Yield (g/g brown solid) | Hexane Solubles (wt. %) | Hexane** Extractibles (wt.%) | Bulk Dens. (lbs./ft³) |
| --- | --- | --- | --- | --- |
| I | 4,325 | 2.2 | 2.8 | 27 |
| I* | 3,725 | 0.4 | 1.1 | 30 |
| ***,* | 4,500 | 1.0 | 4.5 | 31 |

*BTS and 2,4,6-collidine added to the reactor mix in small quantities.
**Soxhlet type extraction
***Control. See previous Example.

EXAMPLE XIV

Polymerization conditions were the same as in Example XII

TABLE

| Example No. | Polymerization Activity*** (g/g brown solid/hr.) | Hexane*** Solubles (wt. %) |
| --- | --- | --- |
| V**** | 223 | 3.4 |
| * | 169 | 1.6 |
| V**** | 187 | 3.4 |
| ** | 162 | 1.3 |

*Brown solid made by Example V except that the ethyl benzoate treatment was made by procedure outlined in CA 85, 22120 w (1976) which is an abstract of Jap. Kokai 76 24,685/2-28-76. A 60° C. treatment.
**Same as * except that the brown solid was washed and suspended in fresh hexane prior to use in polymerization.
***Each asterisked value is the average of four polymerizations. The others are the average of two polymerizations.
****Final ethyl benzoate treatment step eliminated.

EXAMPLE XV

Polymerization conditions were the same as in Example XII.

TABLE

| Example No. | Polymerization Activity*** (g/g brown solid/hr) | Hexane*** Solubles (wt. %) |
| --- | --- | --- |
| VI | 200 | 2.7 |
| * | 240 | 2.5 |
| ** | 191 | 0.7 |
| VII | 206 | 3.0 |
| * | 226 | 3.4 |
| VIII | 185 | 2.2 |
| * | 230 | 2.9 |
| IX | 165 | 1.5 |
| ** | 173 | 0.7 |
| X | 182 | 1.0 |
| * | 219 | 2.9 |
| XI | 209 | 2.1 |
| * | 228 | 2.5 |

*Sample of brown solid made without final treatment run as control.
**Small amounts of BTS and Coll added to the reactor.
***All values the average of more than one polymerization.

What is claimed is:

1. In a process for preparing a brown solid comprising beta titanium trichloride and some, up to ten mol percent, of at least one first organic electron pair donor compound selected from the group consisting of hydrocarbyl ethers, said brown solid having a surface area above about eighty square meters per gram and a pore volume above about one-tenth cubic centimeter per gram and made by process comprising
   (a) reducing titanium tetrachloride with a reductant comprising a lower alkyl dialkylaluminum compound,
   (b) contacting the solid product of (a) with said first donor compound and heating from about ambient to about 80° C.
   (c) thereafter treating the solid product of (b) with titanium tetrachloride, the improvement which consists essentially of contacting in a separate step an additional organic electron pair donor compound selected from the group consisting of hydrocarbyl esters, amines, organic borates, or coordinating cyclic hydrocarbons containing at least one double bond at about 10° C. to about 45° C. with the product of (b) or (c) above prior to use of said solid in polymerization.

2. The process of claim 1 wherein said treatment is after (c).

3. The process of claim 2 wherein said additional donor compound is a lower alkyl, alkyl ester of benzoic acid.

4. The process of claim 2 wherein said additional donor compound is a lower alkyl trialkylamine.

5. The process of claim 2 wherein said additional donor compound is a lower alkyl, alkyl borate.

6. The process of claim 2 wherein said additional donor compound is a coordinating, cyclic seven or eight carbon hydrocarbon containing at least three double bonds.

7. The process of claim 2 wherein said reductant is a lower alkyl, alkylaluminum sesquichloride, said first donor compound comprises isopentyl ether and said additional donor compound is ethyl benzoate.

8. The process of claim 2 wherein said reductant is a lower alkyl, alkylaluminum sesquichloride, said first donor compound comprises isopentyl ether, and said additional donor compound is cycloheptatriene.

9. The process of claim 2 wherein said reductant is a lower alkyl, alkylaluminum sesquichloride, said first donor compound comprises isopentyl ether, and said additional donor compound is trimethyl borate.

* * * * *

UNITED STATES PATENT AND TRADEMARK OFFICE
CERTIFICATE OF CORRECTION

PATENT NO. : 4,111,836
DATED : September 5, 1978
INVENTOR(S) : Nicholas M. Karayannis et al.

It is certified that error appears in the above—identified patent and that said Letters Patent is hereby corrected as shown below:

Column 1, line 27, "is which" should read -- is made --.

Column 4, line 42, "insert" should read -- inert --.

Column 6, line 52, "0.6 gram" should read -- 0.6 ml --.

Signed and Sealed this

Eleventh Day of December 1979

[SEAL]

Attest:

SIDNEY A. DIAMOND

Attesting Officer

Commissioner of Patents and Trademarks